(No Model.)
D. A. SCHOCH & H. W. BOLENDER.
CHURN.
No. 279,447. Patented June 12, 1883.
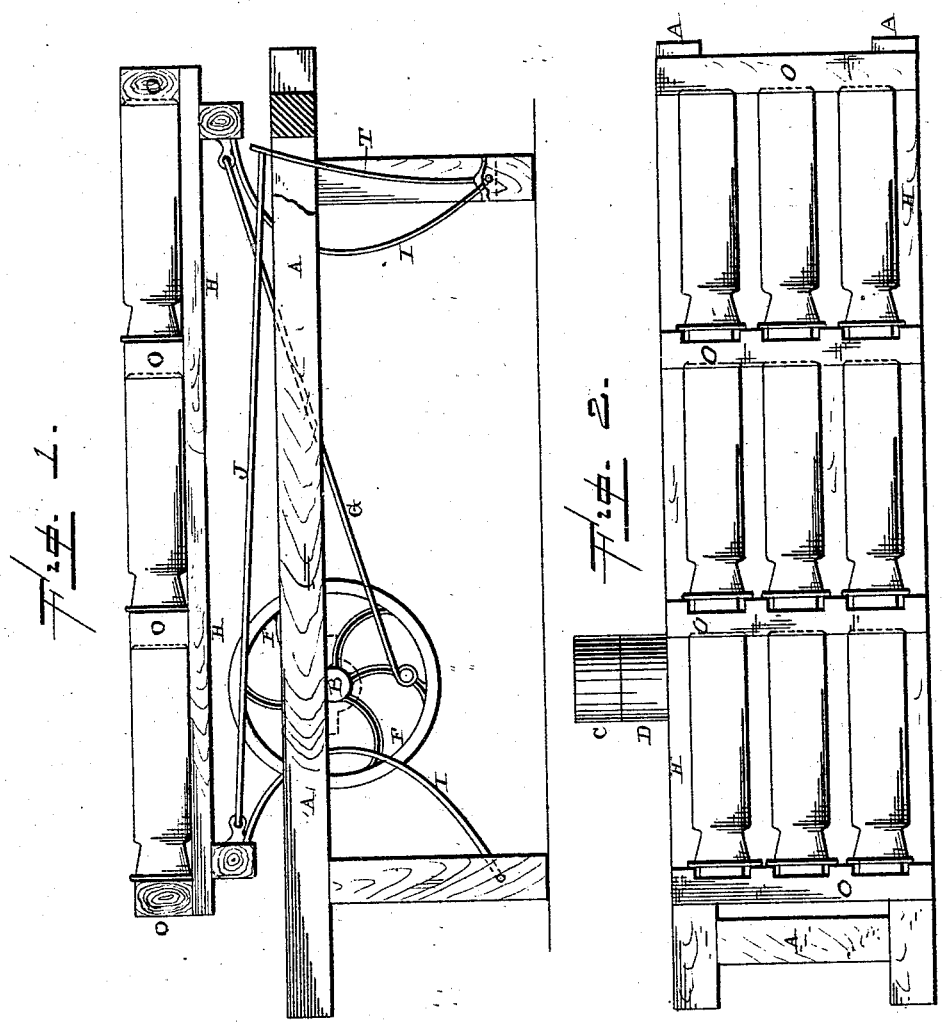
Witnesses.
Louis F. Gardner
E. D. York
Inventors.
D. A. Schoch,
H. W. Bolender.
per
F. A. Lehmann,
Atty.

UNITED STATES PATENT OFFICE.

DAVID A. SCHOCH AND HARRISON W. BOLENDER, OF ORANGEVILLE, ILL.

CHURN.

SPECIFICATION forming part of Letters Patent No. 279,447, dated June 12, 1883.

Application filed February 21, 1883. (No model.)

*To all whom it may concern:*

Be it known that we, DAVID A. SCHOCH and HARRISON W. BOLENDER, of Orangeville, in the county of Stephenson and State of Illinois, have invented certain new and useful Improvements in Churns; and we do hereby declare the following to be a full, clear, and exact description of the invention, such as will enable others skilled in the art to which it pertains to make and use it, reference being had to the accompanying drawings, which form part of this specification.

Our invention relates to an improvement in churns, which is designed specially for testing the qualities of different kinds of cream; and it consists in the combination of a suitable supporting frame-work in which the operating-shaft is journaled, the frame to which the different churns are attached, supporting-rods upon which the churn-frame is made to reciprocate, a rod which is connected directly with the crank, and a rod which is connected to the frame-work at one end and a spring at the other, so as to help move the churning-frame past the dead-center, all of which will be more fully described hereinafter.

The object of our invention is to provide a churn which is intended especially for creameries, so as to enable a number of different qualities cream to be churned at the same time and under exactly the same conditions, so as to show their relative values.

Figure 1 is a side elevation of our invention complete, (shown partly in section.) Fig. 2 is a plan view of the same.

A represents a suitable frame-work of any desired shape, size, or construction, and upon which the driving-shaft B is mounted. This shaft is provided with the loose pulley C, and a tight pulley, D, at its outer end, and with a crank-wheel, F, at its inner end. To the crank-wheel is connected the rod G, by which the churning-frame H is made to reciprocate. This churning-frame H is supported upon four curved rods, I, which are pivoted at their lower ends in the frame A, and upon which the churning-frame moves freely back and forth. Also secured to the frame A, at one end, is a suitable spring, T, which is attached at its upper end to the rod J, which is attached at its other end to the churning-frame H. As the churning-frame is made to reciprocate back and forth, the rod J forces the spring back and forth with the frame, and this spring serves to force the frame back past the dead-center, and to cause the frame to move much more evenly and smoothly than it would do without it. The churning-frame H has a number of cross-pieces, O, extending across its surface, and these cross-pieces are recessed so as to receive one end of each of the different churns, and are grooved vertically to receive the other end. The churns, of whatever size or shape that may be preferred, are placed side by side upon this churning-frame, and are held securely in position between these cross-pieces, so as to form, as it were, a part of the churning-frame. When the belt is applied to the fast pulley upon the driving-shaft the churning-frame is made to reciprocate rapidly back and forth, and thus throw the cream from one end of the churns to the other. A comparison of the cream in the different churns at any time after the churning has begun will readily show the different values of the different kinds of cream being used.

Having thus described our invention, we claim—

In a churn, the combination of the frame H O, adapted to hold a number of churns, rod J, spring T, supporting-rods I, and mechanism for reciprocating the frame, substantially as shown.

In testimony whereof we affix our signatures in presence of two witnesses.

DAVID A. SCHOCH.
HARRISON W. BOLENDER.

Witnesses:
HIRAM SKINNER,
LEVI K. BABB.